C. W. Sherwood,
School Desk and Seat,
No. 2,866. Reissued Feb. 11, 1868.
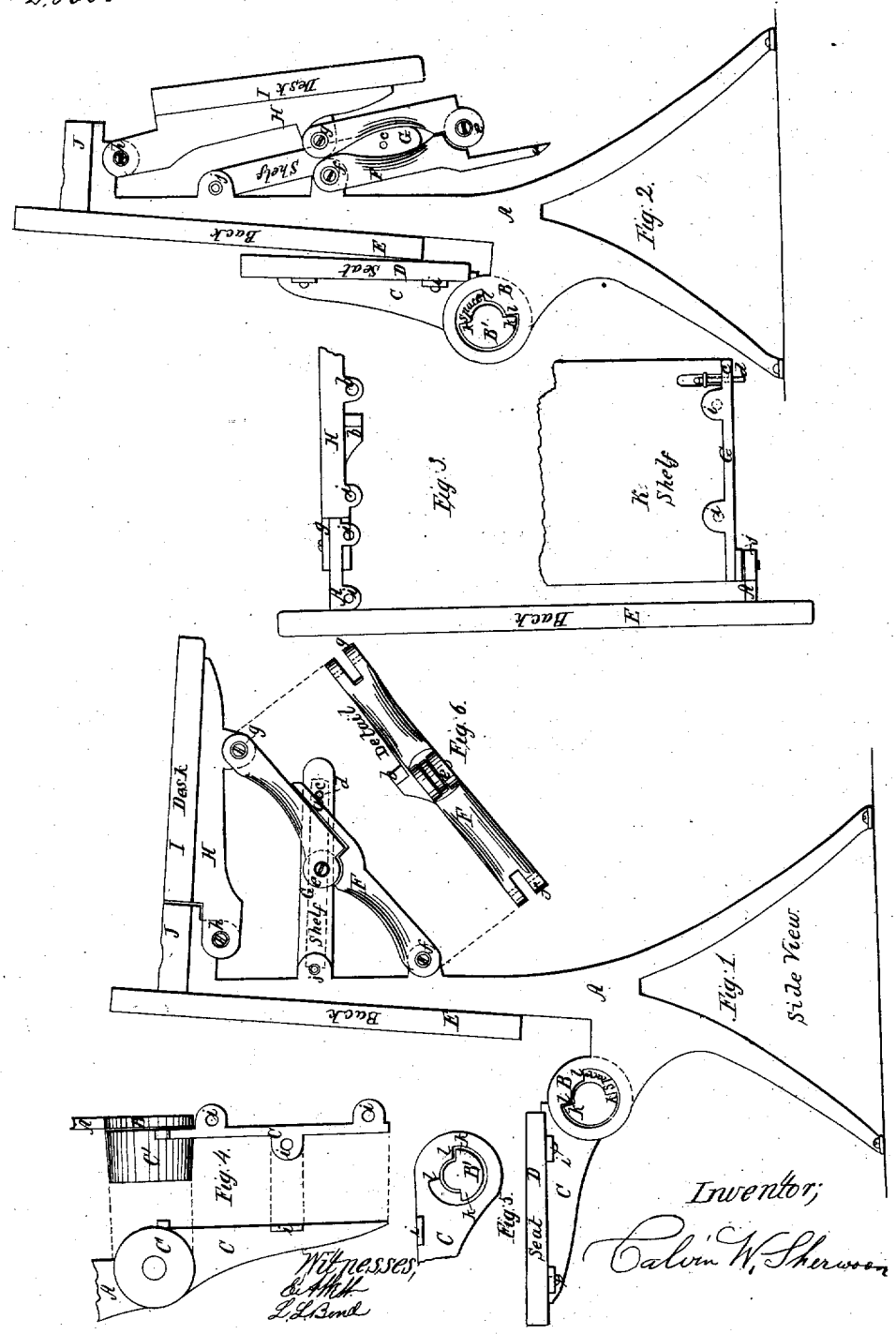
N. PETERS, PHOTO-LITHOGRAPHER, WASHINGTON, D. C.

United States Patent Office.

CALVIN W. SHERWOOD, OF CHICAGO, ILLINOIS.

*Letters Patent No.* 59,466, *dated November* 6, 1866; *reissue No.* 2,866, *dated February* 11, 1868.

DIVISION B.

IMPROVED SCHOOL-DESK AND SEAT.

The Schedule referred to in these Letters Patent and making part of the same.

TO ALL WHOM IT MAY CONCERN:

Be it known that I, CALVIN W. SHERWOOD, of the city of Chicago, in the county of Cook, and State of Illinois, have invented certain new and useful Improvements in School-Desks; and I do hereby declare that the following is a full, clear, and exact description thereof, reference being had to the accompanying drawings, making part of this specification, in which—

Figure 1 is a side or end view.

Figure 2, the same view, with the desk folded.

Figure 3, a top view of the shelf, with a portion removed, and showing the top of the arm at one end.

Figures 4 and 5 are not essential to this specification.

Figure 6, a top view of the jointed brace detached.

Like letters refer to the same parts in all the figures.

The object of my invention, herein described, is to so construct a school-desk that the top of the desk and the shelf may be folded down.

To enable others skilled in the art to make and use my invention, I proceed to describe its construction and operation.

The standards A are made of cast iron, and sufficiently long to bring the desk to the required height. The seat-back E, parts of the top I and J, and shelf K, are attached to brackets by means of screws. At the upper end of the standard, short arms are attached, to which the stationary portion J of the top is attached, and to which the arms H are pivoted at *h*. These arms, H, are attached by an ordinary hinge-joint, and support the folding part I of the top of the desk. They are supported by the jointed braces F, which are hinged to them at *g*, and to the standards at *f*. The distance between the joints *h* and *g* and *h* and *f* should be the same. The braces F are jointed with a knuckle-joint, *e*, at the middle; and the location of the joints is such that the braces will remain in position when the top is elevated, if it be sufficiently heavy, or if there be sufficient weight upon it; but, in order to insure their proper action, and keep them in place in case of any lifting or hitting of the top from below, so that the braces would close, I attach to the lower section a lip or projection, *a*, which extends upwards about half the length of the upper section, and fasten them by slipping out the pins *d*, which are attached to each end of the shelf K. The desk will not then close, however much the desk may be lifted or shaken. On the inside of the lower sections, I also attach or cast the projections or ledges *b*, which support the shelf K, and in their action, being opposed to the pins *d*, keep the braces firm. The shelf K is hinged, by means of the arms G, to the standards at *j*, and the pins *d* pass through the holes *c* in these arms. When the pins are withdrawn, the shelf has, in some respects, independent movements, and, in folding, slides upon the edges *b*.

In operation, when it is desired to fold the desk, the pins *a* are withdrawn, the braces F brought outward, so that the joint *e* will be below the line of the joints *g* and *f*, when it will fold by its own weight. I thus make a desk which is particularly desirable in schools where gymnastics are practised, and where lectures and exhibitions are given in the school-room, or religious services held therein.

A seat may be attached to the standards A in the usual manner, if desired.

Having thus fully described my desk, what I claim as new, and desire to secure by Letters Patent, is—

1. The jointed braces F, when provided with lips *a* and ledges *b*, substantially as and for the purposes specified.

2. The combination and arrangement of the ledges *b*, lips *a*, and pins *d*, with the braces F and hinged shelf K, substantially as specified.

3. The arrangement and combination of the hinged arms H, jointed braces F, and hinged arms G, with the standards A and desk-top I J, substantially as and for the purposes specified.

C. W. SHERWOOD.

Witnesses:

E. A. WEST,

E. B. SHERMAN.